Jan. 14, 1958 W. E. ATKINSON 2,819,601
DRAWBOLT AND LOCK ASSEMBLY
Filed April 4, 1955
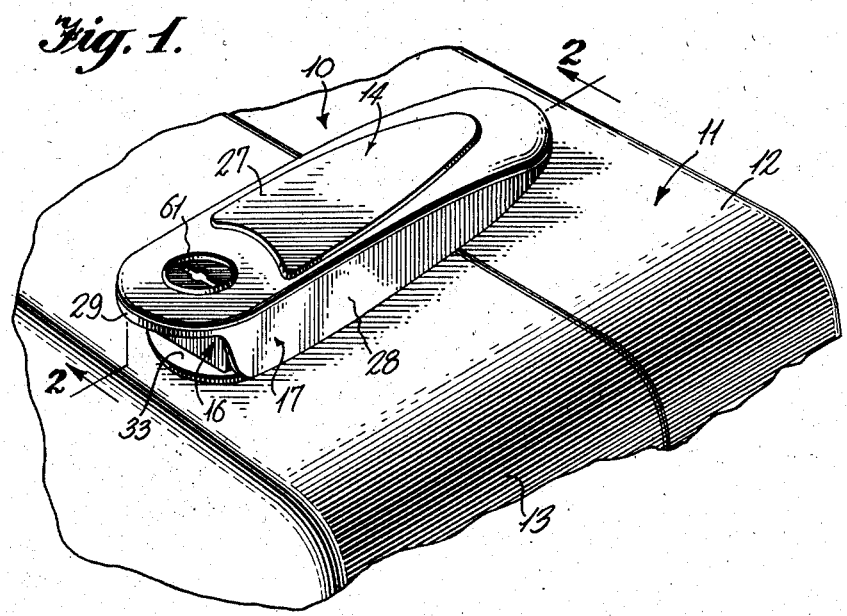
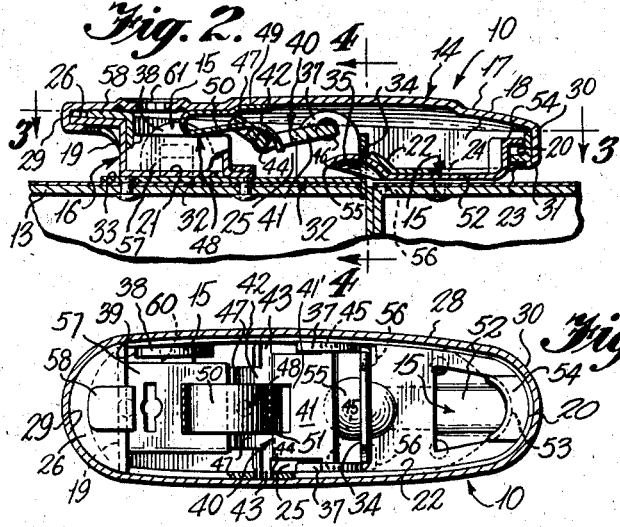
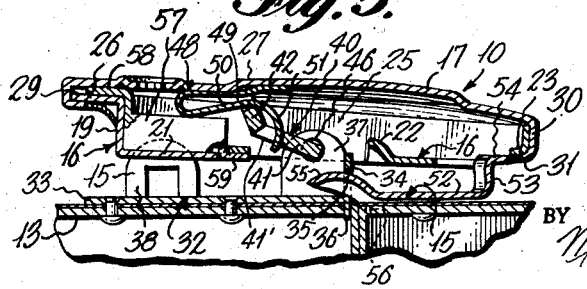
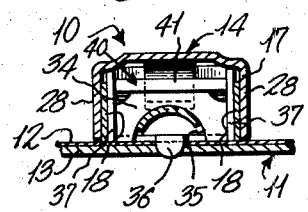
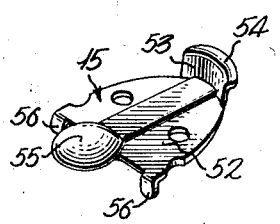
INVENTOR
Wallace E. Atkinson
BY Mason, Fenwick & Lawrence
ATTORNEYS United States Patent Office 2,819,601
Patented Jan. 14, 1958

2,819,601

DRAWBOLT AND LOCK ASSEMBLY

Wallace E. Atkinson, Petersburg, Va., assignor to Long Manufacturing Company, Inc., Petersburg, Va., a corporation of Virginia Application April 4, 1955, Serial No. 498,940

3 Claims. (Cl. 70—73)

The present invention relates in general to locks for travelling bags, trunks, and similar articles of luggage, and more particularly to drawbolt locks specifically designed for hardside suitcases and the like.

Among the many types of lock or catch mechanisms employed in connection with hardside luggage a popular variety which has been in frequent commercial use is the type commonly referred to in the trade as drawbolt or surging link locks. This variety is distinguished by the provision of a catch member, usually termed the drawbolt, which is typically pivoted to a movable fulcrum or link at a point spaced from a second pivotal axis on which the link is pivotally supported to a mounting plate. The mounting plate is affixed to one of the relatively movable sections of the luggage in such a relation to a fixed keeper lug on the other section of the luggage so as to draw the drawbolt into covering latched relation with the keeper member when the drawbolt is shifted about the two pivotal axes into closed relation against the mounting plate therefor. The end of the link remote from its point of connection with the mounting plate and the drawbolt component is usually exposed since this end of the control link must be accessible to be manually elevated and lowered in order to latch and unlatch the drawbolt from its keeper. This provides an undesirable visible line of separation between the drawbolt component and the link which are usually assembled to form an elongated linearly aligned assembly, and requires the provision of rivets between the link and drawbolt components in addition to rivets which are usually provided between the link and mounting plate components. When lock mechanisms are incorporated in such drawbolt locks, the bolt and tumbler components are usually supported internally within a downwardly opening housing formed by the link component to cooperate with upstruck keeper lugs on the mounting plate so as to retain the link in overlying relation against the mounting plate when the bolt is interlocked with the keepers. These construction features, as well as the rather complex manufacturing characteristics of the components, are responsible for the rather significant construction costs and complexity of assembly of such drawbolt mechanisms.

An object of the present invention is the provision of a novel drawbolt lock assembly constructed in such a manner as to eliminate the necessity of an exposed linkage interconnecting the mounting plate and drawbolt components so as to present a unitary massive appearance of attractive design.

Another object of the present invention is the provision of a drawbolt cover and keeper plate assembly which cooperate in a novel manner to improve the security of such latch mechanisms.

Another object of the present invention is the provision of a drawbolt lock mechanism for hardside luggage and the like having improved drawing action to insure proper mating of the separable components of the suitcase.

Another object of the present invention is the provision of a novel drawbolt lock construction having improved construction and assembly characteristics enabling the realization of a marked reduction in the labor costs formerly associated with such mechanisms.

Another object of the present invention is the provision of a novel drawbolt lock assembly for hardside luggage and the like which is formed of sheet metal components assembled without the provision of rivets.

Another object of the present invention is the provision of a drawbolt lock and keeper plate assembly for hardside, non-framed suitcases and the like wherein projecting lugs are provided on the components of the assembly designed to be in direct contact with the suitcase surfaces to facilitate precise relative location of the assembly components.

Other objects, advantages and capabilities of the present invention will become apparent from the following detailed description taken in conjunction with the accompanying drawing illustrating a preferred embodiment of the invention.

In the drawing:

Figure 1 is a perspective view of a drawbolt lock and keeper assembly shown in locked relation on a fragmentary suitcase wall section.

Figure 2 is a longitudinal vertical section view of the drawbolt lock and keeper assembly taken along the line 2—2 of Figure 1.

Figure 3 is a section view of the drawbolt lock assembly taken along the longitudinal section plane 3—3 of Figure 2.

Figure 4 is a transverse vertical section view of the drawbolt lock assembly taken along the line 4—4 of Figure 2.

Figure 5 is a longitudinal vertical section view of the drawbolt lock and keeper assembly taken along the same section plane as Figure 2, illustrating the components in unlatched condition; and Figure 6 is a perspective view of the keeper components.

Referring to the drawing wherein like reference characters designate corresponding parts throughout the several figures, there is illustrated in Figure 1 a swinging link drawbolt lock, generally indicated by the reference character 10, embodying the preferred construction of the present invention, which is designed to be associated with hardside luggage such as the suitcase 11 to latch and lock the separable lid 12 and body 13 of the suitcase in closed relation. To this end, the drawbolt component 14 is designed to be swingably supported on the body or tray 13 of the suitcase 11 to enable it to be manually shifted into latched engagement with a keeper 15 fixed on the lid 12 of the suitcase.

The drawbolt component 14 in the preferred embodiment is formed entirely of sheet metal components and comprises a drawbar 16 encased in a drawbar cover 17. The drawbar 16 is formed of an upwardly opening generally dish-shaped member having side walls 18, end walls 19 and 20, the end wall 19 lying preferably in a plane transverse to the longitudinal axis of the drawbar and the end wall 20 being rounded to join the side walls 18. Adjacent the end wall 19 is a bottom wall portion 21 which extends along a minor portion of the length of the drawbar and joins the end wall 19, and an intermediate bridge portion 22 extends transversely between the side walls 18 and lying substantially in the plane of the bottom wall portion 21. The intermediate bridge portion 22 defines, with an inwardly projecting flange 23 projecting from the end wall 20, a keeper aperture 24 lying therebetween, and forms the forward boundary of a central well 25 lying between the transverse bridge 22 and the bottom wall portion 21. An outwardly projecting lip 26 extends from the upper edge of the end wall 19 and is rounded, as indicated in Figure 3, to form, with other elements to be later described, a fingerpiece for facilitating manual disengagement of the drawbolt 14 from the keeper 15.

The drawbar cover 17, which encases the drawbar 16, comprises a top wall 27 bounded by depending side walls 28 overlying the side walls 18 of the drawbar 16, a retaining lip 29 extending around and conforming to the marginal shape of the lip 26 projecting from the drawbar 16, and an end wall portion 30 embracing the outer surface of the curved end wall 20 of the drawbar 16, the end wall 30 having a retaining tongue 31 fitting into a complementary depressed portion of the end wall flange 23. The retaining tongue 31 and the lip 29 maintain the drawbar cover 17 in encasing relation with the drawbar 16 with the cover side walls 28 embracing and intimately contacting the side walls 18 of the drawbar forming a unitary structure therewith.

A mounting plate 32 for the drawbolt 14 is provided with a base panel 33 which is affixed to the adjacent wall of the suitcase tray or body 13 by rivets or other suitable securing means and is provided with an upstanding integral flange forming an end wall 34 at the edge thereof located closely adjacent the line of separation between the lid 12 and tray 13 of the suitcase and projecting in a plane perpendicular to the plane of the base panel 33, the end wall 34 having a semicircular recess 35 therein to cooperate with the keeper 15, in a manner to be described later. Projecting oppositely from the end wall 34 and in the plane thereof is a locator lug 36 adapted to be projected through the adjacent wall of the suitcase tray 13 immediately above and contacting the upper edge of the conventional rigid backing material which is covered to form the suitcase wall, or adapted to overlie the finished edge of the suitcase section, to properly locate the mounting plate 32 relative to the plane of separation of the suitcase lid 12 and tray 13. Projecting upwardly from the opposite lateral edges of the base panel 33 immediately adjacent the end wall 34 are a pair of ears 37 integral with the base panel 33 adapted to project into the central well 25 of the drawbar 16, and positioned adjacent the opposite end of the base panel 33 and projecting upwardly from one lateral edge thereof in alignment with one of the ears 37 is a U-shaped hasp 38 adapted to project into a slot 39 in the drawbar bottom wall portion 21 when the bottom wall portion 21 is closed against the base panel 33.

Interconnecting the drawbar 16 and its cover 17 with the mounting plate 32 is a swinging link 40 having a lower portion 41 and an upper portion 42 inclined at the obtuse angle thereto. Adjacent the lower end of the upper inclined portion 42 are a pair of oppositely projecting marginal ears 43 adapted to project through apertures 44 in the side walls 18 of the drawbar and adjacent the lower edge of the lower swinging link portion 41 are a pair of oppositely projecting marginal ears 45 extending into apertures 46 in the ears 37 of the mounting plate 32. By this expedient, the swinging link 40 is pivotally connected along spaced parallel transverse axes to the drawbar 16 and the mounting plate 32 to permit pivotal and longitudinal movement of the drawbolt 14 relative to the suitcase tray 13. The free edge of the bottom wall portion 21 of the drawbar 16 against which the swinging link 40 bears when the drawbar 16 is shifted through its maximum extent of travel to the right, as viewed in Figure 5, determines the limit of movement of the drawbar away from the keeper 15.

A pair of projections 47 extending in the plane of the upper inclined portion 42 of the swinging link at the upper edge thereof define therebetween a recess through which a leaf spring 48 extends, the leaf spring being folded upon itself intermediate the ends thereof to provide an upper leg 49 lying against the underside of the top wall 27 of the drawbar cover 17 and a lower leg 50 terminating in an arcuately curved portion 51 having its end projecting through an intermediate slot 41' in the lower portion 41 of the swinging link 40. The bight of the folded leaf spring 48 is projected through the recess provided between the projections 47 of the swinging link 40 so that portions of both the upper and lower legs 49, 50 of the leaf spring extend through this recess. The organization of the leaf spring 48 with the swinging link 40 and the spaced pivotal interconnections between the drawbar 16 and mounting plate 32 provide a resilient overthrow connection, giving snap action to the drawbolt.

The keeper 15, which is illustrated in detail in Figure 6, is provided with a base 52 having an upwardly projecting keeper lug 53 at one end thereof, terminating in an outwardly projecting flange 54 adapted to be projected through the keeper aperture 24 in the drawbar 16 when the drawbolt is closed upon the keeper 15 and disposed adjacent the drawbar end wall 30 with the flange 54 overlapping the drawbar flange 23, as illustrated in Figure 2, to prevent disengagement of the drawbolt from the keeper along the axis perpendicular to the suitcase wall. The edge of the keeper 15 remote from the keeper lug 53 is substantially complementary in length to the width of the drawbar 16 and is provided in its central region with a tongue 55 projecting oppositely to the keeper lug flange 54 adapted to be projected through the semicircular recess 35 in the mounting plate end wall 34 when the suitcase lid 12 is closed upon the suitcase tray 13 to insure proper alignment of the lid with the tray, whereby the keeper is interlocked both with the mounting plate 32 and with the drawbar 16 when the drawbar is closed upon the keeper in the manner illustrated in Figure 2. Also extending downwardly from this edge of the keeper 15 and disposed to both sides of the tongue 55 are a pair of locator lugs 56 designed to be projected through the adjacent wall covering material of the suitcase lid 12 and overlie the lower edges of the backing material therefor or to overlie the finished edge of the suitcase cover section, to precisely locate the keeper 15 in the same manner as that previously described in connection with the mounting plate 32. The locator lugs 56 on the keeper 15 and the locator lug 36 in the mounting plate 32 thereby insure precise relative location of the various relatively movable components of the drawbolt lock in a manner which insures ease and uniformity of manufacture. The keeper 15 is, of course, secured by rivets or other conventional means to the suitcase lid 12.

A conventional lock 57, preferably of the rectangular wafer-type, is adapted to be mounted in the interior of the assembled drawbar 16 and drawbar cover 17 on the drawbar bottom wall portion 21 and against the end wall 19 thereof. The lock housing 57 is provided with projecting tongues 58 and 59 at the opposite end walls thereof to secure the lock 57 in position on the drawbar 16. The tongue 58, as illustrated in Figures 2 and 3, is adapted to overlie the lip 26 of the drawbar 16 and be clamped against the same when the retaining lip 29 of the drawbar cover 17 is crimped about the drawbar lip 26, and the tongue 59 is adapted to be inserted through a complementary slot provided therefor adjacent the free edge of the bottom wall portion 21 and bent under the bottom wall portion. The lock 57 is provided with the usual laterally reciprocable bolt 60 adapted to be projected through the opening provided in the hasp 38, and a conventional key opening 61 is provided in the top wall 27 of the drawbar cover 17.

The operation of the drawbolt lock is as follows:

Assuming the portion of the suitcase lid 12 carrying the keeper 15 to be pivoted away from the portion of the suitcase tray 13 carrying the drawbolt 14, the lid 12 is shifted into closed relation with the tray 13 while the drawbolt 14 is pivoted to an open position wherein the drawbolt 14 is moved to the right, as viewed in Figure 5, to the maximum extent permitted by the free edge of the drawbolt bottom wall portion 21 and the drawbolt is pivoted counterclockwise from the position illustrated in Figure 5 to dispose the lower edge of the end wall 19 in contact with the mounting plate 32. The mounting plate end wall 34 and its recess 35 are thereby exposed beneath the right hand end of the drawbolt 14, as viewed in Figure 5, so as to receive the keeper tongue 55 in seated relation in the end wall recess 35. The assembled drawbar 16 and cover 17 are then shifted in a clockwise direction about the transverse pivot axes formed by the ears 43 and 45, as viewed in Figure 5, to position the keeper lug 53 and its flange 54 within the keeper aperture 24. The drawbar and cover 16, 17 are then drawn downwardly and to the left, as viewed in Figures 2 and 5, to close the drawbolt 16 against the mounting plate 32 to the position shown in Figure 2, and the drawbar 16 is resiliently held in such closed position due to the repositioning of the spring 48 relative to the swinging link 40 to cause the leaf spring to urge the portion of the swinging link 40, to which the drawbar 16 is pivotally connected, downwardly toward the mounting plate 32. To lock the drawbolt lock 10 in such closed position, a key may then be inserted through the key cylinder 61 in the drawbar cover 17 and into the lock 57 to project the bolt 60 into the recess provided in the hasp 38. To unlock the drawbolt lock this procedure is merely reversed.

While only one preferred embodiment of the invention has been particularly shown and described, it is apparent that various modifications may be made in the invention without departing from the spirit and scope thereof, and it is desired, therefore, that only such limitations shall be placed thereon as are set forth in the appended claims.

I claim:

1. A drawbolt assembly for use with hardside luggage of the type having hinged sections comprising a keeper plate adapted to be affixed to one of said sections adjacent the free edge thereof and having a marginal tongue projecting therefrom and formed in the shape of a spherical segment adapted to extend beyond the free edge of said section and a terminally flanged keeper projecting perpendicularly from the other end thereof, a drawbolt mounting plate adapted to be affixed to another section of said luggage adjacent the free edge thereof including an integral upstanding marginal flange wall parallel to the plane of separation of the sections and having an aperture therein corresponding to the cross section of said intermediate portion of said marginal tongue adapted to receive said tongue in intimately interfitted relation therein, a housed elongated drawbolt having a keeper-accommodating aperture adjacent one end thereof, link means connected respectively to said drawbolt and said mounting plate by a displaceable pivot and a stationary pivot permitting displacement of said drawbolt longitudinally and perpendicularly relative to said mounting plate and keeper plate to seat said keeper in said keeper-accommodating aperture with a bounding portion of said drawbolt underlapping the flange of said keeper to hold the same against relative withdrawal along the axis of said keeper, said underlapping aperture bounding portion being disposed when said drawbolt is in intimate contact with said mounting plate and keeper plate to maintain said marginal keeper tongue seated in said flange wall aperture with the upper surface of said tongue in intimate contact with the bounding surfaces of said aperture, and spring means formed of a recurved flat spring compressed between a wall of the drawbolt and said link means with one leg of said spring underlying the wall of the drawbolt and the other bearing against the edge of said link means remote from said stationary pivot to resiliently bias said drawbolt toward intimate contacting relation with said mounting plate and keeper when said drawbolt approximates contacting relation with the same and for resiliently restraining said drawbolt against tilting movement relative to said link means when said drawbolt is fully extended away from said mounting plate.

2. A drawbolt assembly for use with hardside luggage of the type having hinged sections comprising a keeper plate adapted to be affixed to one of said sections adjacent the free edge thereof and having a marginal tongue in the shape of a spherical segment projecting along an upwardly inclined plane from one end of said plate to extend beyond the adjacent free edge of said section and a keeper projecting perpendicularly from the other end thereof terminating in a flange extending in opposite relation to said tongue, a mounting plate adapted to be affixed to another section of said luggage adjacent the free edge thereof including an integral upstanding marginal flange wall parallel to the plane of separation of the sections and having a semi-circular aperture therein substantially corresponding in cross section to the maximum cross section of said tongue adapted to receive said tongue therein when the sections are closed upon each other and a pair of marginal upstanding apertured ears projecting from the plane of said mounting plate, an elongated drawbolt including a drawbar formed of sheet metal to define an upwardly opening body having a bottom wall and connecting side and end walls, said bottom wall having a central well therein and a keeper-accommodating aperture adjacent one end thereof, an uninterrupted drawbar cover in the shape of a downwardly opening case encasing said drawbar in nested relation therein and having side and end flanges lapping said side and end walls of said drawbar, a swinging link for interconnecting said drawbolt and mounting plate having a pair of oppositely projecting integral trunnions adjacent the lower edge thereof projecting into said ear apertures to form a stationary pivotal connection with said mounting plate ears and another pair of integral trunnions projecting through said drawbar side walls forming a displaceable pivotal connection with said drawbolt spaced from said stationary pivotal connection, said pivotal connections permitting longitudinal and tilting movements of said drawbolt from a spaced position toward said mounting and keeper plates in contacting parallelism therewith to progressively seat said keeper in said keeper-accommodating aperture, position a drawbar portion bounding said keeper-accommodating aperture in underlying relation with said keeper flange, and cam said keeper longitudinally relative to said drawbolt to project said keeper tongue into the aperture therefor a sufficient distance to disposed the largest portion of said convex marginal tongue in abutment with the bounding surfaces of said aperture, said drawbar bottom wall having a concave indentation therein conforming to a portion of said tongue and formed in an edge thereof bounding said central well to intimately embrace said tongue when the drawbolt is in closed position said swinging link and mounting plate ears being received through said well and fully encased within said drawbolt when said drawbolt contacts said mounting and keeper plates.

3. A drawbolt assembly for use with hardside luggage of the type having hinged sections comprising a keeper plate adapted to be affixed to one of said sections adjacent the free edge thereof in the shape of a spherical segment and having a marginal tongue projecting from one end of said plate to extend beyond the adjacent free edge of said section and a keeper projecting perpendicularly from the other end thereof terminating in a flange extending in opposite relation to said tongue, a mounting plate adapted to be affixed to another section of said luggage adjacent the free edge thereof including an integral upstanding marginal flange wall parallel to the plane of separation of the sections and having an aperture therein corresponding to the cross section of said intermediate portion of said marginal tongue adapted to receive said tongue in intimately interfitted relation therein when the sections are closed upon each other and a pair of marginal upstanding apertured ears projecting from the plane of said mounting plate, an elongated drawbolt including a drawbar formed of sheet metal to define an upwardly opening body having a bottom wall and connecting side and end walls, said bottom wall having a central well therein and a keeper-accommodating aperture adjacent one end thereof, an uninterrupted drawbar cover in the shape of a downwardly opening case encasing said drawbar in nested relation therein and having side and end flanges lapping said side and end walls, a swinging link for interconnecting said drawbolt and mounting plate having a pair of oppositely projecting integral trunnions adjacent the lower edge thereof projecting into said ear apertures to form a stationary pivotal connection with said mounting plate ears and another pair of integral trunnions projecting through said drawbar side walls forming a displaceable pivotal connection with said drawbolt spaced from said stationary pivotal connection, said pivotal connections permitting longitudinal and tilting movements of said drawbolt from a spaced position toward said mounting and keeper plates in contacting parallelism therewith to progressively seat said keeper in said keeper-accommodating aperture, position a drawbar portion bounding said keeper-accommodating aperture in underlying relation with said keeper flange, and cam said keeper longitudinally relative to said drawbolt to project said keeper tongue into the aperture therefor to dispose the upper surface of said tongue in intimate contact with the bounding surfaces of said aperture, said swinging link and mounting plate ears being received through said well and fully encased within said drawbolt when said drawbolt contacts said mounting and keeper plates, a key-controlled lock having a lock casing nested in said drawbolt in the end thereof remote from said keeper-accommodating aperture and including a reciprocable bolt, hasp means upstanding from said mounting plate to be projected into encased relation within said drawbolt and interlocked with said bolt when said drawbolt is in contacting parallelism with said mounting and keeper plates, and spring means formed of a recurved flat spring compressed between the top wall of said drawbar cover and said swinging link with one leg thereof underlying said cover top wall and the other leg thereof bearing against the edge of said link remote from said stationary pivot, a portion of said spring adjacent the curve therein projecting between said lock casing and the top wall of said cover to resiliently urge said lock casing against the bottom wall of said drawbar and restrain said lock casing against movement therein.

References Cited in the file of this patent

UNITED STATES PATENTS

| | | |
|---|---|---|
| 110,071 | Ranous | Dec. 13, 1870 |
| 1,503,462 | Albert | Aug. 5, 1924 |
| 1,603,418 | Scheider | Oct. 19, 1926 |
| 2,358,607 | Tinnerman | Sept. 19, 1944 |

FOREIGN PATENTS

| | | |
|---|---|---|
| 841,930 | France | June 1, 1939 |